United States Patent
Bette et al.

(10) Patent No.: US 6,841,277 B2
(45) Date of Patent: Jan. 11, 2005

(54) METHOD FOR OPERATING A FUEL CELL PLANT AND FUEL CELL PLANT

(75) Inventors: Willi Bette, Erlangen (DE); Christian Merkel, Dortmund (DE)

(73) Assignee: Siemens Aktiengesellschaft, Munich (DE)

(*) Notice: Subject to any disclaimer, the term of this patent is extended or adjusted under 35 U.S.C. 154(b) by 432 days.

(21) Appl. No.: 09/950,429

(22) Filed: Sep. 10, 2001

(65) Prior Publication Data

US 2002/0037444 A1 Mar. 28, 2002

Related U.S. Application Data

(63) Continuation of application No. PCT/DE00/00566, filed on Feb. 28, 2000.

(30) Foreign Application Priority Data

Mar. 10, 1999 (DE) .......................................... 199 10 695

(51) Int. Cl.[7] .............................................. H01M 8/04
(52) U.S. Cl. .............................. 429/13; 429/26; 429/34
(58) Field of Search .............................. 429/12, 13, 26, 429/34

(56) References Cited

U.S. PATENT DOCUMENTS

| | | | |
|---|---|---|---|
| 4,500,612 A | | 2/1985 | Fujii et al. |
| 5,641,585 A | * | 6/1997 | Lessing et al. ............... 429/26 |
| 5,647,534 A | | 7/1997 | Kelz et al. |
| 5,976,722 A | * | 11/1999 | Muller et al. ................. 429/13 |
| 6,610,431 B1 | * | 8/2003 | Walsh et al. .................. 429/13 |

FOREIGN PATENT DOCUMENTS

| | | |
|---|---|---|
| DE | 94 05 466.5 | 7/1994 |
| DE | 197 18 970 A1 | 11/1998 |
| DE | 199 48 214 A1 | 4/2000 |
| DE | 100 00 406 A1 | 7/2000 |
| EP | 0 780 917 A1 | 6/1997 |
| JP | 62 017 962 | 1/1987 |
| JP | 05-343083 | 12/1993 |
| JP | 06333583 | 12/1994 |
| JP | 08264199 A | 10/1996 |
| WO | WO 97/10619 | * 3/1997 |
| WO | 98/04011 | 1/1998 |

OTHER PUBLICATIONS

"NFPA 496—Standard for Purged and Pressurized Enclosures for Electrical Equipment", *National Fire Protection Association, 1998*.

* cited by examiner

*Primary Examiner*—Jonathan Crepeau
(74) *Attorney, Agent, or Firm*—Laurence A. Greenberg; Werner H. Stemer; Gregory L. Mayback

(57) ABSTRACT

A method for operating a fuel cell plant and a fuel cell plant are provided. The thermal efficiency of a fuel cell plant results from the useful heat which is generated per quantity of fuel. Heat which is radiated from the fuel cell plant into the environment is lost and cannot be utilized. The method minimizes the radiation of heat from the fuel cell plant. Air for operation of the fuel cells is passed into a housing which surrounds heat-radiating components of the fuel cell plant. The air flows around the components, absorbs the heat which is radiated and delivers it to the fuel cell block, where the heat is emitted to cooling water that cools the fuel cell block and transfers the heat to water of a heating-water circuit.

9 Claims, 1 Drawing Sheet

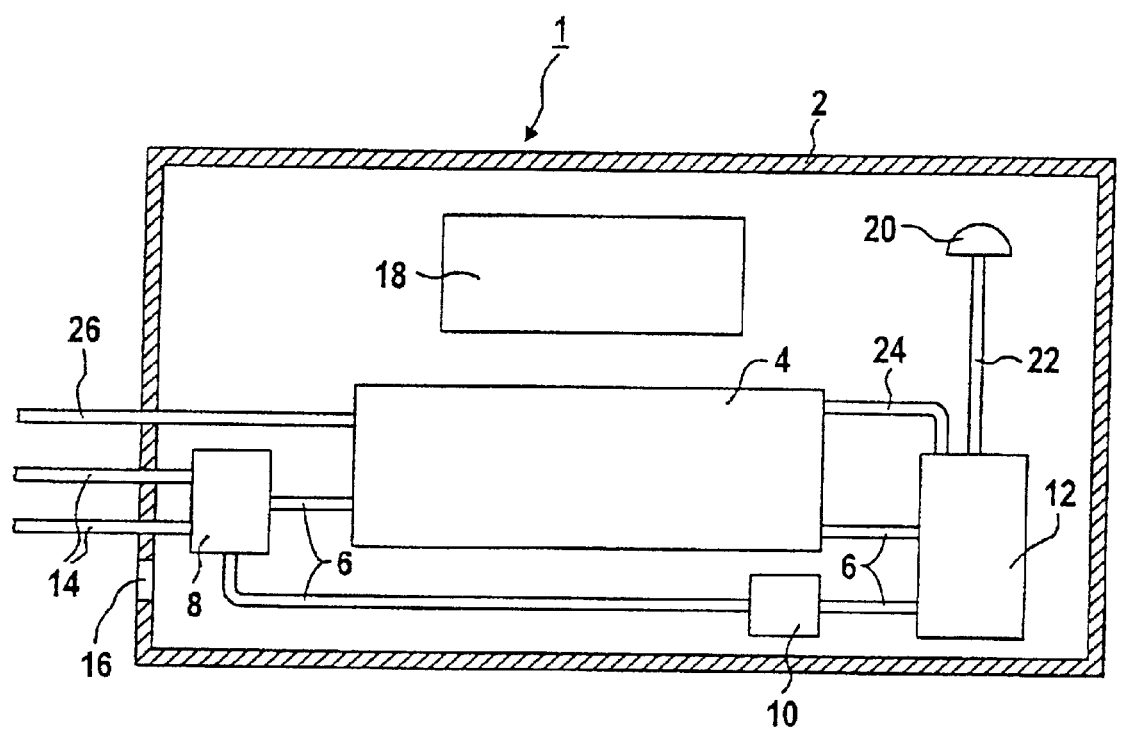

METHOD FOR OPERATING A FUEL CELL PLANT AND FUEL CELL PLANT

CROSS-REFERENCE TO RELATED APPLICATION

This application is a continuation of copending International Application No. PCT/DE00/00566, filed Feb. 28, 2000, which designated the United States.

BACKGROUND OF THE INVENTION

Field of the Invention

The invention relates to a method for operating a fuel cell plant and to a fuel cell plant.

It is known that during the electrolysis of water, water molecules are broken down into hydrogen ($H_2$) and oxygen ($O_2$) by electric current. In a fuel cell, that operation takes place in the reverse direction. Electrochemical combining of hydrogen and oxygen to form water results in electric current being generated with a high efficiency, and without any emission of pollutants and carbon dioxide ($CO_2$) if pure hydrogen is used as the fuel gas. Even with a technical-grade fuel gas, for example natural gas or coal gas, and with air instead of pure oxygen, in which case the air may additionally be enriched with oxygen, a fuel cell produces significantly fewer pollutants and less carbon dioxide than other energy generators which operate with fossil energy carriers.

The technical implementation of the fuel cell principle has led to various solutions, specifically with different types of electrolytes and with operating temperatures of between 80° C. and 1000° C. The fuel cells are classified as low-temperature, medium-temperature and high-temperature fuel cells depending on their operating temperature. Those fuel cells in turn differ from one another by having different technical constructions.

A single fuel cell supplies an operating voltage of less than one volt. Therefore, a multiplicity of fuel cells are stacked on top of one another and are combined to form a fuel cell block. In the specialist literature, a block of that type is also known as a stack. Connecting the fuel cells of the fuel cell block in series allows the operating voltage of a fuel cell plant to be a few hundred volts.

One or more fuel cells cannot be operated on their own. They are therefore operated in a fuel cell plant which includes a fuel cell block, an operating part and plant electronics. The operating part includes devices for supplying the fuel cells with operating gases, i.e. with oxygen, or air, and fuel gas. Furthermore, the operating part includes devices for discharging the water product, for dissipating heat and for carrying away the electric current which is generated in the fuel cells. The plant electronics control the interaction of the various devices of the fuel cell plant.

A fuel cell plant operates particularly effectively and inexpensively if its overall efficiency is high. The overall efficiency of a fuel cell plant represents a combination of the electrical and thermal efficiency of the plant. The electrical and thermal efficiency result from the useful electrical or thermal energy which is generated per quantity of fuel. In order to achieve particularly effective operation of the fuel cell plant, it is desirable for as much as possible of the electrical and thermal energy which is generated to be made usable.

When a fuel cell plant is operating, large amounts of thermal energy, i.e. large amounts of heat, are formed. By far the greatest part of the heat is generated in the fuel cell block. Some of that heat is dissipated from the fuel cell block by a cooling water circuit. In order to make that heat usable, the cooling-water circuit is, for example, thermally connected to a heating-water circuit, which absorbs the heat of the cooling water. By way of example, the water of the heating-water circuit may be passed through heating systems of a house to heat the house in that way. However, some of the heat generated by the fuel cell block leaves in the form of radiant heat. It is radiated into the room in which the fuel cell plant is positioned. In a conventional fuel cell plant, that radiant heat is not utilized.

The fuel cell block is the component of a fuel cell plant which radiates the most heat. However, other components of the fuel cell plant, for example a circulation pump, an air compressor or components of the plant electronics, together also radiate considerable amounts of heat into the environment. That radiant heat is also not utilized by a conventional fuel cell plant.

SUMMARY OF THE INVENTION

It is accordingly an object of the invention to provide a method for operating a fuel cell plant and a fuel cell plant, which overcome the hereinafore-mentioned disadvantages of the heretofore-known methods and devices of this general type and in which heat radiated by components of the fuel cell plant is made usable.

With the foregoing and other objects in view there is provided, in accordance with the invention, a method for operating a fuel cell plant, which comprises providing heat-radiating components including an air compressor and a fuel cell block having fuel cells and providing a housing surrounding the heat-radiating components. A cooling-water circuit is connected to the fuel cell block and a heating-water circuit is connected to the cooling-water circuit. Air for operation of the fuel cells is conducted into the housing, around the heat-radiating components and then to the fuel cell block with the air compressor. The fuel cell block is cooled with cooling water of the cooling-water circuit and water of the heating-water circuit is heated with heat from the cooling water.

In a first step, the invention is based on the consideration that heat which is radiated by components of the fuel cell plant is made usable by being fed to a heating-water circuit. This can be achieved due to the fact that heat-radiating components of the fuel cell plant are thermally insulated and water-cooled. This measure largely suppresses the radiation of the thermal energy from the insulated components into the environment and leads to the heat being dissipated through the cooling-water circuit so that it can then be transferred to a heating-water circuit. However, this measure is highly complex.

In a second step, the invention is based on the consideration that air is fed to the fuel cells as operating gas. This air is heated in the fuel cell block to the temperature of the fuel cell block, with the result that heat is extracted from the fuel cell block. Moreover, the invention is based on the consideration that heat-radiating components of the fuel cell plant heat the air surrounding them. When this preheated air is used as operating gas for the fuel cells, less energy is extracted from the fuel cell block when the air is being heated to the operating temperature of the fuel cells. Consequently, the fuel cell block emits more heat to the cooling water, which transfers this heat to the water of the heating circuit.

In a third step, the invention is based on the consideration that a housing which surrounds the heat-radiating components of the fuel cell plant prevents the hot air from being dissipated into the environment of the plant. Air is passed into this housing from the environment of the housing. This takes place, for example, by sucking in air with an air compressor in the interior of the housing, with the result that air flows through an opening in the housing into the interior of the housing. This air which is flowing in then flows around the heat-radiating components of the fuel cell plant, is heated by these components, is sucked in by the compressor, and is fed to the fuel cell block.

Through the use of this method, thermal energy which is radiated by components of the fuel cell plant is fed to the fuel cell block, from which it is transferred to the water of the heating circuit through the use of the cooling water. The radiated heat is therefore rendered usable.

In an advantageous configuration of the invention, the air is compressed in a liquid ring compressor, before it is fed to the fuel cell block. As a result, the air is not only compressed to a predetermined density, which has an advantageous effect on operation of the fuel cell plant, but is also simultaneously humidified. This humidifying significantly extends the service life of electrolyte membranes which are used, for example, in PEM (Polymer Electrolyte Membrane) fuel cells.

Expediently, cooling water is passed from the cooling-water circuit into the liquid ring compressor. This has the advantage of heating the air in the liquid ring compressor to the temperature of the cooling water, i.e. to approximately the operating temperature of the fuel cells, before being fed to the fuel cell block. Moreover, the air is humidified with the very pure cooling water, which is beneficial to operation of the fuel cell plant.

With the objects of the invention in view, there is also provided a fuel cell plant, comprising heat-radiating components including a fuel cell block and an air compressor.

A housing has an interior surrounding the heat-radiating components and has an opening for introducing air surrounding the housing into the interior of the housing. The air compressor has a suction opening in the interior of the housing for introducing air from the interior of the housing into the air compressor. A cooling-water circuit is connected to the air compressor and to the fuel cell block. A heating-water circuit is thermally connected to the cooling-water circuit.

A fuel cell plant of this type makes it possible to make the heat which is radiated by components of the fuel cell plant usable in the manner described above. In this case, the thermal efficiency of the fuel cell plant increases as more heat-radiating components are surrounded by the housing. If the housing surrounds the entire fuel cell plant, it can simultaneously be used as sound insulation and as a cabinet for the plant. In this case, operating elements, display elements or a screen may function as components of the housing.

The thermal connection between the cooling-water circuit and the heating-water circuit is produced, for example, by a heat exchanger, with the aid of which heat from the cooling water is transferred to water of the heating circuit.

In an expedient configuration of the invention, the housing is thermally insulated. This substantially prevents the hot air in the housing from heating the outer wall of the housing and the housing itself from radiating heat into the environment.

The housing is advantageously constructed as a double-walled housing. This configuration of the housing also substantially prevents the hot air in the housing from heating the outer wall of the housing and the housing itself from radiating heat into the environment.

The air compressor is expediently a liquid ring compressor. This configuration of the invention causes the air to the humidified before it is fed to the fuel cells, without a further component having to be added to the fuel cell plant for this purpose.

In a further advantageous configuration of the invention, the fuel cell block includes PEM fuel cells. PEM fuel cells are operated at a low operating temperature of approximately 80° C., have a favorable overload behavior and a long service life. Moreover, they behave favorably in the event of rapid load changes and can be operated with air instead of pure oxygen. All of these properties make PEM fuel cells particularly suitable for use in the mobile sector such as, for example, for driving vehicles of a very wide range of types.

Other features which are considered as characteristic for the invention are set forth in the appended claims.

Although the invention is illustrated and described herein as embodied in a method for operating a fuel cell plant and a fuel cell plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a diagrammatic, partly sectional, elevational view of an exemplary embodiment of the invention.

DESCRIPTION OF THE PREFERRED EMBODIMENTS

Referring now in detail to the single FIGURE of the drawing, there is seen a very greatly simplified illustration of a fuel cell plant 1. A thermally insulated housing 2 surrounds all other components of the fuel cell plant 1. A fuel cell block 4, which includes 80 PEM fuel cells, is disposed in the housing 2. The fuel cell block 4 is cooled by water in a cooling circuit 6, which flows from the fuel cell block 4 to a heat exchanger 8, from there to a circulation pump 10, then onward to a liquid ring compressor 12 and back into the fuel cell block 4. In the heat exchanger 8, the cooling water emits heat to water in a heating-water circuit 14. The water of the heating-water circuit 14 heats household heating systems.

The PEM fuel cells are operated by using air and hydrogen as operating gases. Air from the environment of the fuel cell plant 1, which is at a temperature of approximately 20° C., is passed through an opening 16 in the housing 2 into the interior of the housing 2, as a result of a slight vacuum which is generated in the interior of the housing by the liquid ring compressor 12. There, the air flows around heat-emitting components of the fuel cell plant 1 such as, for example, the heat exchanger 8, the fuel cell block 4, an electronic plant control unit 18, the circulation pump 10 and the liquid ring compressor 12. In the process, it is heated to approximately 40° C. Then, it is sucked through a suction opening 20 and flows through a suction pipe 22 into the liquid ring compressor 12, where the air is compressed and is humidified to 100% atmospheric humidity by the cooling water. The cooling water, which is at a temperature of approximately 75°, heats the air in the liquid ring compressor 12 to approximately 75° C. Having been compressed, humidified and heated, the air is then fed through an air feed line 24 to the fuel cell block 4. After it has flowed through the fuel cell block 4, it is discharged from the fuel cell block 4 through an outgoing air line 26. Further components of the fuel cell plant 1, some of which also radiate heat, such as for example a heat exchanger in the outgoing air path, incoming and outgoing paths for fuel gas, a water separator and pumps, are not shown in the FIGURE for the sake of clarity.

The air flowing through the housing 2 of the fuel cell plant 1 flows around all of the heat-radiating components of the fuel cell plant 1, including pipes and connections, and dissipates heat from the components. The heat is fed by the air to the fuel cell block 4 and is therefore made usable. In this way, only insignificant quantities of heat penetrate through the housing 2 to the outside from the interior of the thermally insulated housing 2. This method of guiding the air results in it no longer being necessary for individual components of the fuel cell plant 1 to be insulated in order to prevent radiation of heat. Consequently, the production of a fuel cell plant is considerably simplified by the invention.

We claim:

1. A method for operating a fuel cell plant, which comprises:
    providing heat-radiating components including an air compressor and a fuel cell block having fuel cells;
    providing a housing surrounding the heat-radiating components;
    connecting a cooling-water circuit to the fuel cell block;
    connecting a heating-water circuit to the cooling-water circuit;
    conducting air for operation of the fuel cells into the housing, conducting the air around the heat-radiating components and then supplying the air to the fuel cell block with the air compressor;
    cooling the fuel cell block with cooling water of the cooling-water circuit; and
    heating water of the heating-water circuit with heat from the cooling water.

2. The method according to claim 1, which further comprises using a liquid ring compressor as the air compressor.

3. The method according to claim 2, which further comprises conducting the cooling water out of the cooling-water circuit into the liquid ring compressor.

4. The method according to claim 3, which further comprises heating the air in the liquid ring compressor to substantially the temperature of the cooling water.

5. A fuel cell plant, comprising:
    heat-radiating components including a fuel cell block and an air compressor;
    a housing having an interior surrounding said heat-radiating components and having an opening for introducing air surrounding said housing into said interior of said housing;
    said air compressor having a suction opening in said interior of said housing for introducing air from said interior of said housing into said air compressor;
    a cooling-water circuit connected to said air compressor and to said fuel cell block; and
    a heating-water circuit thermally connected to said cooling-water circuit.

6. The fuel cell plant according to claim 5, wherein said housing is thermally insulated.

7. The fuel cell plant according to claim 5, wherein said housing is a double-walled housing.

8. The fuel cell plant according to claim 5, wherein said air compressor is a liquid ring compressor.

9. The fuel cell plant according to claim 5, wherein said fuel cell block includes PEM fuel cells.

* * * * *